US012798556B2

(12) United States Patent
Berger et al.

(10) Patent No.: US 12,798,556 B2
(45) Date of Patent: Nov. 17, 2026

(54) METHOD FOR SUPPORTING A PARKING PROCESS OF A MOTOR VEHICLE

(71) Applicant: AUDI AG, Ingolstadt (DE)

(72) Inventors: Johann Berger, Reischach (DE); Markus Thurmeier, Adlkofen (DE)

(73) Assignee: AUDI AG, Ingolstadt (DE)

( * ) Notice: Subject to any disclaimer, the term of this patent is extended or adjusted under 35 U.S.C. 154(b) by 190 days.

(21) Appl. No.: 18/912,373

(22) Filed: Oct. 10, 2024

(65) Prior Publication Data

US 2025/0128700 A1 Apr. 24, 2025

(30) Foreign Application Priority Data

Oct. 19, 2023 (DE) ..................... 10 2023 128 727.3

(51) Int. Cl.

| | |
|---|---|
| ***G06K 9/00*** | (2022.01) |
| ***B60Q 1/48*** | (2006.01) |
| ***B60W 30/06*** | (2006.01) |
| ***G06V 10/422*** | (2022.01) |
| ***G06V 20/56*** | (2022.01) |

(52) U.S. Cl.

CPC ............... *B60W 30/06* (2013.01); *B60Q 1/48* (2013.01); *G06V 10/422* (2022.01); *G06V 20/56* (2022.01)

(58) Field of Classification Search

CPC ..... B60W 30/06; G06V 10/422; G06V 20/56; B60Q 1/48; B60Q 1/24; B60Q 2400/50

See application file for complete search history.

(56) References Cited

U.S. PATENT DOCUMENTS

| | | | | |
|---|---|---|---|---|
| 10,246,000 | B2 | 4/2019 | Schneider et al. | |
| 2005/0099821 | A1* | 5/2005 | Potter | B60Q 1/48 362/548 |
| 2020/0086918 | A1* | 3/2020 | Solar | B60Q 1/249 |
| 2020/0294399 | A1* | 9/2020 | Schuller | G08G 1/149 |
| 2021/0094536 | A1* | 4/2021 | Suzuki | B60W 30/06 |
| 2021/0107463 | A1* | 4/2021 | Nakagawa | G06V 20/586 |
| 2021/0107465 | A1* | 4/2021 | Hiei | B60W 30/06 |

FOREIGN PATENT DOCUMENTS

| | | |
|---|---|---|
| DE | 10 2016 004 259 A1 | 10/2017 |
| DE | 10 2018 220 855 B3 | 1/2020 |

* cited by examiner

*Primary Examiner* — Avinash Yentrapati

(74) *Attorney, Agent, or Firm* — Sterne, Kessler, Goldstein & Fox P.L.L.C.

(57) ABSTRACT

The present disclosure relates to a method for supporting a parking process of a motor vehicle by projecting a light marking by means of a lighting device onto a wall surface visible to the person parking. At least one image of a wall surface is taken. The at least one image is analyzed to ascertain a three-dimensional structure shown in or on the wall surface. Then, a light marking is determined such that it has a marking border that is a negative of the structure border. Finally, the light marking is projected onto the wall surface, wherein the position of the marking border changes relative to the structure border depending on the distance or position of the vehicle.

18 Claims, 2 Drawing Sheets

METHOD FOR SUPPORTING A PARKING PROCESS OF A MOTOR VEHICLE

TECHNICAL FIELD

Various embodiments of the present disclosure relate to a method for supporting a parking process by projecting a light marking by means of a lighting device onto a wall surface visible to the person parking.

BACKGROUND

Modern motor vehicles have assistance systems that support or facilitate the parking process. Sensors are known that are installed in the front apron and the rear apron and can be used to detect the distance to an obstacle. During the parking process, the vehicle approaches the obstacle; after the obstacle is detected and once the distance falls below a distance threshold value, a warning is issued, usually a beep, sometimes also a graphic representation, which the person driving the vehicle can use to orient themselves. As the vehicle gets closer to the obstacle, the beep frequency increases until it becomes a continuous tone when another distance threshold value is reached, for example 40 cm. Any getting closer to the obstacle beyond this point is then virtually uncontrolled. Cameras that are installed on the vehicle and record the surroundings and provide live images of the environment can also be used in such an assistance system. The images are shown on a display. This allows for an improved optical detection of the situation, but even in this representation, due to the mounting position of the cameras, for example the edge region of the bumper cannot be seen, so that an exact referencing to the obstacle is not possible. In addition, these assistance systems do not offer any way of checking to what extent the vehicle has been parked straight into the parking space, i.e., whether its longitudinal axis is perpendicular to a wall surface that bounds a parking space, or at an angle thereto.

From DE 10 2018 220 855 B3 a motor vehicle is known in which in order to support a parking process two light markings are projected onto a wall surface bounding the parking region by means of a lighting device installed on the front of the vehicle. These are initially spaced vertically from each other. As the vehicle approaches the wall surface, the light markings move closer together and contact each other when a certain, defined distance to the wall is reached.

A similar system is known from US 2005/0099821 A1. There, two light markings are projected onto the wall surface by the lighting device, which are horizontally offset from one another and move closer together as the vehicle approaches the wall surface. When a defined distance is reached, the two light markings merge into a single light marking.

BRIEF DESCRIPTION OF THE DRAWINGS

The accompanying drawings are incorporated herein and form a part of the specification.

DETAILED DESCRIPTION

Figure 1:
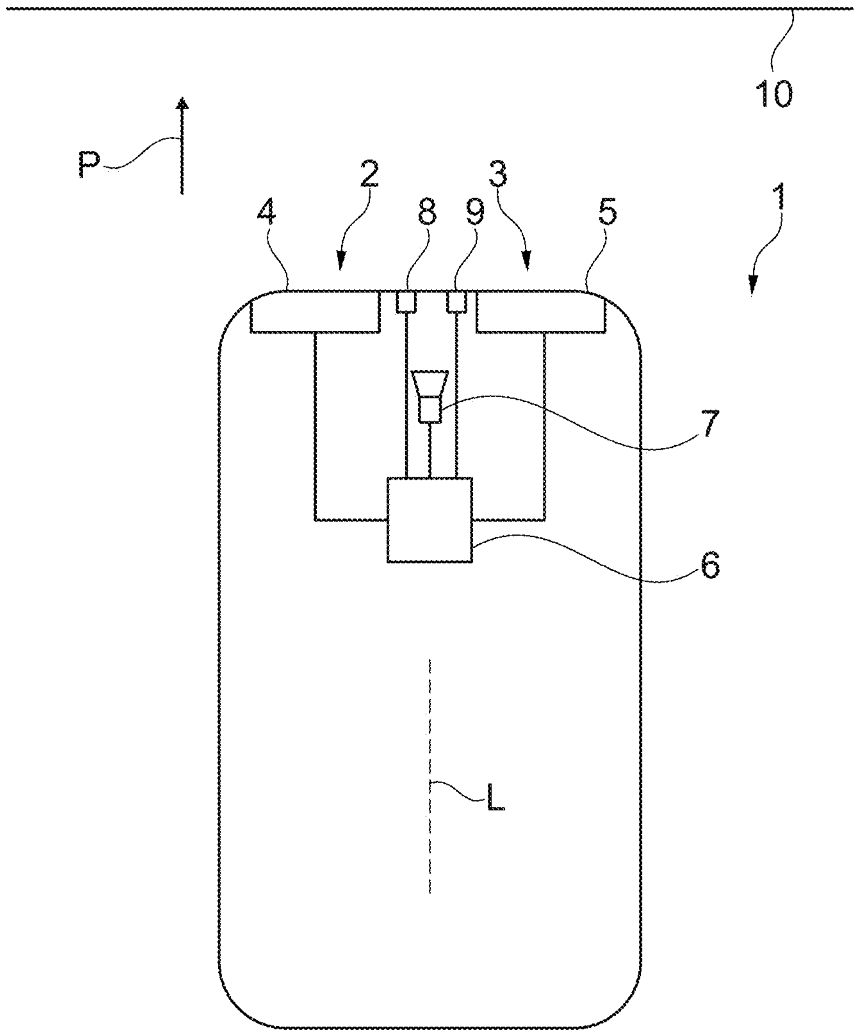
FIG. 1 illustrates an exemplary schematic diagram of a motor vehicle in a parking situation, according to some embodiments.

The present disclosure is based on the problem of providing an improved method for supporting a person when parking.

To solve the problem, the present disclosure provides a method for supporting a parking process of a motor vehicle by projecting a light marking by means of a lighting device onto a wall surface visible to the person parking, the method comprising: taking at least one image of the wall surface; analyzing the image to ascertain at least one three-dimensional structure shown in the image in or on the wall surface; ascertaining a structure border extending at least around portions of the structure; determining the light marking such that it has a marking border which is the negative of the structure border; and projecting the light marking onto the wall surface, wherein the position of the marking border relative to the structure border changes depending on the distance and/or position of the vehicle.

The method according to the present disclosure provides for the projection of a light marking onto the wall surface to support the parking process, wherein the light marking has a specific marking border which was determined depending on a three-dimensional structure in or on the wall surface. For this purpose, in a first step an image of the wall surface is taken using a suitable camera device installed on the vehicle. The captured image is processed and analyzed by means of a suitable image analysis tool or a control device in order to ascertain whether a three-dimensional structure is provided on or in the wall surface in the image. If such a structure is detected, by means of the image analysis means or the control device a structure border is ascertained which borders the structure at least in portions, i.e., runs around some portions of the structure. The image analysis tool has a suitable contour or edge detection algorithm that allows such a border to be detected.

In the next step, the specific geometry of a light marking to be projected onto the wall surface is determined. This means that the light marking is determined in such a way that it has a marking border which is the negative of the structure border. The determination of the light marking can, for example, again take place in the control device which also carried out the image analysis and which preferably also serves to control the lighting device, where the determining of the light marking can however also take place in a separate control device which only controls the lighting device.

Once the corresponding border of the light marking has been determined, i.e., its specific geometry has been determined, the light marking is projected onto the wall surface using the lighting device. The projection is carried out at the beginning of the supporting, i.e., immediately after the light marking is determined, in such a way that the marking border is at a distance from the structure border. As the vehicle approaches the wall surface, the relative position of the light marking to the structure, i.e., of the marking border to the structure border, changes continuously. The marking border moves closer and closer to the structure border, whose position is fixed. Once the ideal distance, which can also be defined by the user if necessary, is reached, the marking border is exactly adapted to the structure border, i.e., they run parallel to each other or are directly adjacent to each other. Because the person driving the vehicle is looking forward through the windshield, he or she sees the light marking and its getting closer to the three-dimensional structure, and can detect the moment at which the best possible match between the marking border and the structure border is present.

This assistance system can be activated either automatically or by the person themselves. The automatic provision takes place, for example, depending on an ascertaining of the vehicle's surroundings and detection of a basic parking situation, in conjunction with the detection of the distance to a potential wall surface. When a corresponding minimum distance is reached, image capture is then initiated, followed by structure ascertainment as well as the determining of the light marking and its projection, while the distance measurement is continuously further carried out so that as the distance is reduced, the light marking can be brought ever closer to the three-dimensional structure until the borders interlock when the defined ideal parking distance is reached.

However, the system not only supports the achievement of the best possible parking distance, but also the most correct alignment of the vehicle relative to the wall surface, i.e., preferably with the vehicle's longitudinal axis orthogonal to the plane of the wall surface. This is because a corresponding angular offset between the longitudinal axis of the vehicle and the plane of the wall surface can of course also be visually displayed via the projection of the light marking. Using suitable sensors in the vehicle, it is possible to record on the one hand the spatial direction in which the vehicle's longitudinal axis runs, and on the other hand the position and course of the wall surface plane, and thus also their relative position to one another. As described, the person driving the vehicle sees the light marking and can not only recognize, for example, the vertical offset between the marking border and the structure border, which indicates the distance between the vehicle and the wall surface, but also the horizontal offset between the marking border and the structure border. Since the light marking is projected several meters before the ideal distance position is reached, the person can accordingly vary the longitudinal axis of the vehicle via steering movements while slowly approaching the wall surface in such a way that an oblique position can largely be compensated. This means that the horizontal position of the light marking shifts with a change in the relative position of the vehicle's longitudinal axis to the wall surface, where, ideally, when the ideal alignment of the vehicle's longitudinal axis is achieved, the geometry of the marking border is positioned horizontally to match the structure border, but may still be at a distance vertically. However, the horizontal displacement of the light marking, and thus the support in assuming the exact position of the vehicle's longitudinal axis in relation to the wall surface plane, is optional and does not necessarily have to be carried out.

The person driving the vehicle is thus shown a light marking which has been determined with regard to its geometry or border in relation to the actual geometry of a structure provided on the wall surface. This makes it possible to display the light marking even on wall surfaces that are not flat in some areas due to the three-dimensional structure, this structure being incorporated in the assistance according to the method.

The lighting device can be controlled accordingly via a control device; for example, it is a matrix LED headlight with an array comprising a large number of individual, separately controllable LEDs, as well as associated, also separately controllable micromirrors, which allow a corresponding projection of the light marking on the one hand and also a corresponding generation of the determined marking border, as well as a corresponding tracking depending on the continuously changing distance, and if necessary the continuously ascertained offset of the vehicle's longitudinal direction to the wall surface plane.

According to a first alternative of the present disclosure, one or more objects arranged in front of the wall surface can be determined as the three-dimensional structure. These items may be, for example, garden equipment or tools or the like, i.e., items that are often found in garages, whether single garages or double or multiple garages, arranged on a garage wall that forms the wall surface. These objects can stand on or in front of the wall surface, lean against it, or be hung on it, and the like. Thus, if the person drives into the garage with the vehicle, the wall surface together with the object(s) is acquired as an image, wherein the image analysis means or the control device, which is equipped with such an image analysis means in the form of a program means, then acquires the objects as a three-dimensional structure and ascertains their structure border, i.e., the object border. The light marking is then determined in such a way that it has the negative of the ascertained object border. The person parking then sees, on the one hand, the wall surface with the object(s), and, on the other hand, the light marking projected onto it; as the vehicle approaches the wall surface, the border of the marking comes closer and closer to the structure or object border and, when the ideal distance position is reached, is brought into perfect alignment with it.

As an alternative to detecting objects on the wall surface, it is also conceivable that one or more elevations and/or depressions in the wall surface are determined as the three-dimensional structure. When parking, for example in a parking garage or similar places, corresponding elevations/depressions, such as wall niches, doors or door frames, windows or window frames, projections or similar, can be identified as such structures. These structures also have corresponding borders, wherein their border can also be ascertained in an appropriate manner and used as a basis for determining the light marking.

As already described, a headlight or both headlights are preferably used as the lighting device, since headlights are usually a correspondingly controllable lighting device. Modern headlights often have correspondingly large LED arrays with a large number of individual, separately controllable LEDs with associated, also separately controllable micromirrors, which allow the corresponding generation of the bordering light marking and its variable projection, where by means of such a lighting device the projection of the light marking can also take place at a sufficient height on the wall surface so that the person, who is sometimes sitting somewhat higher up, can also see the light marking as well as possible.

Various embodiments of the present disclosure provide that images of the wall surface are continuously taken even after the start of the projection of the light marking and the accuracy of fit of the marking border to the structure border is ascertained, wherein the driving operation is at least partially controlled automatically depending on the ascertainment result. The camera device continuously records the wall surface during the entire support process, the images then showing the three-dimensional structure and the light marking. By means of the image analysis means or the control device, a continuous image evaluation is carried out to ascertain how precisely the light marking fits the structure, or how precisely the marking border fits the structure border. It is therefore continuously monitored how the marking border gets closer to the structure border. As the vehicle approaches, it is then possible to intervene automatically in driving operation, for example by automatically decelerating the vehicle or even stopping the vehicle automatically if the marking border is ideally aligned with the structure border. The vehicle can therefore at least be stopped automatically when the ideal distance position is reached, although automatic vehicle intervention by the assistance system may also be possible before this. This automatic vehicle guidance, whether it is only automatic stopping or in addition the adjustment of the speed, can also include distance measurement via the sensors installed on the vehicle, i.e., the distance sensors standardly installed in the front apron; that is, the distance measurement values, which can be recorded continuously, are included in the automatic vehicle guidance. If the system provides not only support in maintaining the ideal distance, but also lateral guidance to ensure the best possible alignment of the vehicle relative to the wall surface, it would also be conceivable for the assistance system to automatically intervene in the steering to automatically achieve the best possible precision of fit between the marking border and the structure border; that is, the system would also automatically perform lateral guidance of the vehicle in order to automatically align it as well as possible. This means that the person driving the vehicle does not have to take any action at all during the parking process, and therefore does not have to carry out either the longitudinal guidance and deceleration or the lateral guidance with steering movements. Rather, everything is automated via the assistance system, i.e., it is controlled via one or more control devices integrated into it, so that at least from the start of the projection of the light marking, the driving operation is automatically controlled until the end position is reached, i.e., the vehicle parks itself. It is conceivable that the assistance system is also a self-learning system, i.e., that, for example, an ideal parking distance desired by the person can be learned over one or more parking maneuvers, as well as a lateral parking position, especially when parking the vehicle in a larger private garage.

In addition to the method itself, the present disclosure further relates to a motor vehicle, comprising at least one lighting device, at least one camera device and at least one control device configured to carry out the method of the type described above. The lighting device is preferably a headlight, wherein both the headlights usually present in a motor vehicle can also be incorporated. The camera device is preferably a camera device installed at the front, either in the region of the front apron or the windshield, which device is capable of recording the region in front of the vehicle. The control device can be a central control device that controls or communicates with all integrated system elements. However, it can also be a control system with separate, distributed control devices.

FIG. 1 illustrates an exemplary motor vehicle 1 according to some embodiments, comprising in the example shown two lighting devices 2, 3 in the form of two headlights 4, 5, which are designed as matrix LED headlights, i.e., have an array comprising a plurality of separately controllable LEDs as well as a mirror array comprising a plurality of separately controllable micromirrors. The lighting devices in 3, 4 can be controlled separately via a common control device 6. Furthermore, a camera device 7 in the form of a front camera is provided, which can be installed on a front apron of the vehicle or a windshield of the vehicle. In the example, the camera device 7 communicates with the control device 6, but separate control devices, which in turn communicate with each other, can also be provided. Furthermore, distance sensors 8, 9 are provided on the front, which also communicate with the control device 6 and via which a distance of the motor vehicle 1 to a wall surface 10, which is also shown, can be continuously detected. These distance sensors 8, 9 can for example be ultrasonic sensors. In the example shown, the distance sensors also communicate with the control device 6, although alternatively a separate control device can be provided for this purpose, which communicates with further control devices.

Also shown is the wall surface 10 in front of which the motor vehicle 1 is located and which it wishes to approach (see arrow P) because it wishes to park. In the example shown, it is assumed that the motor vehicle 1 with its vehicle longitudinal axis L is already correctly aligned with respect to the plane of the wall surface 8, i.e., that the vehicle longitudinal axis L is perpendicular to the plane of the wall surface.

To support the parking process, the person driving the vehicle can, for example, switch on an assistance system that supports the parking process by projecting a light marking onto the wall surface 10. Alternatively, this assistance system can also be activated automatically, for example at a sufficiently low speed of, for example, less than or equal to 10 km/h. When the assistance system is activated, the distance sensors 8, 9 are activated, i.e., they measure the distance of the motor vehicle 1 to the wall surface 10 or send corresponding measurement signals to the control device 6, which processes and evaluates them. If, for example, it turns out that a threshold value with regard to the distance of the motor vehicle 1 to the wall surface 10 is reached as the vehicle approaches, the actual guidance functionality of the assistance system is activated, if this is not already done when the system is started up. In any case, the region in front of the vehicle is then continuously recorded using the camera device 7, including images of the wall surface 10. When the first camera image is received, it is immediately evaluated by the control device 6, which has a suitable image analysis means in the form of suitable program software in order to check whether one or more three-dimensional structures on or in the wall surface 10 are present in the camera image. If such structures are present, the control device 6 detects a structure border of the ascertained three-dimensional structure, which runs at least partially along the structure. Then, the control device 6, which as described also controls the two lighting devices in 2, 3, ascertains the geometry of a light marking to be projected onto the wall surface 10 via at least one of the lighting devices 2, 3 in such a way that the light marking has a marking border which borders at least portions of the light marking, and which represents the negative of the detected structure border. Once the light marking has been determined in this way, the light marking is projected onto the wall surface 10 via one or, if appropriate, both lighting devices in 2, 3. Since the motor vehicle 1 is continuously moving towards the wall surface 10, the position of the light marking relative to the structure changes continuously; i.e., the position of the marking border relative to the structure border changes as the approach gets closer. Depending on the structure detected, the light marking can be projected at a sufficiently large distance in such a way that the marking border is clearly spaced far apart from the structure border, whether viewed vertically, horizontally, or completely enclosing the structure, wherein as the approach gets closer, the marking border gets closer and closer to the structure border, whose position is fixed, until, when a defined ideal parking distance is reached, the light marking fits ideally with the structure marking, since they have a positive-negative relationship.

The person driving the vehicle, looking through the windshield at the wall surface, sees both the structure and the projected light marking as well as the change in the position of the marking border relative to the structure border. The person can therefore also recognize the moment at which the marking border ideally adjoins the structure border and can then terminate the further longitudinal guidance of the vehicle, i.e., can stop it, because the ideal parking position with the ideal parking distance has been reached.

By means of a horizontal, i.e., lateral offset of the marking border to the structure border, it is optionally also possible to give the person driving the vehicle information regarding the course of the vehicle's longitudinal axis L to the plane of the wall surface 10. If both are orthogonal to each other, the marking border cannot have a lateral offset to the structure border, except that they are evenly spaced from each other. However, if the vehicle's longitudinal axis L is not orthogonal to the plane of the wall surface 10, a corresponding lateral offset of the marking border to the structure border can be shown, which can of course be compensated by a steering angle, which steering angle leads to the vehicle's longitudinal axis L being changed in its position to the plane of the wall surface 10. This means that this light marking can also provide support with regard to lateral guidance.

Figure 2:
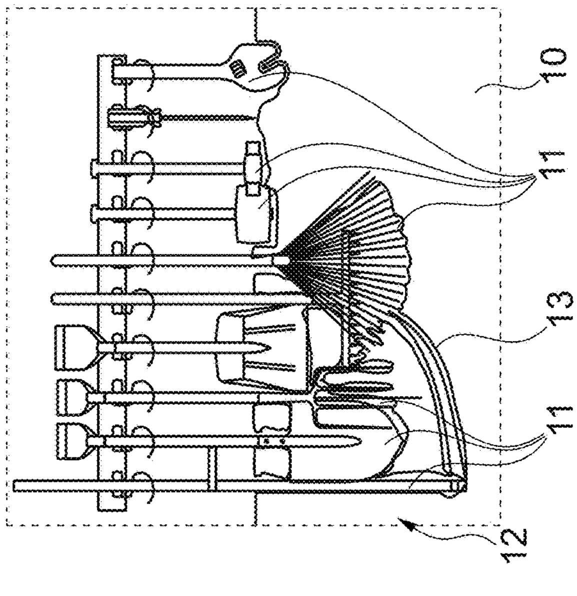
FIG. 2 illustrates an exemplary schematic diagram of a detail of a wall surface with a three-dimensional structure provided thereon in the form of objects arranged on the wall surface, according to some embodiments.
Figure 3:
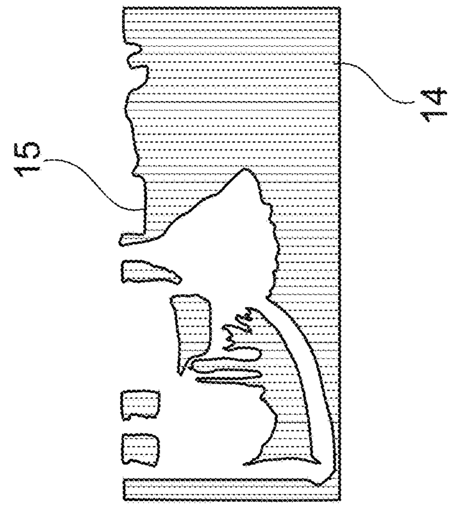
FIG. 3 illustrates an exemplary schematic diagram of a light marking determined depending on the border of the structure, according to some embodiments.
Figure 4:
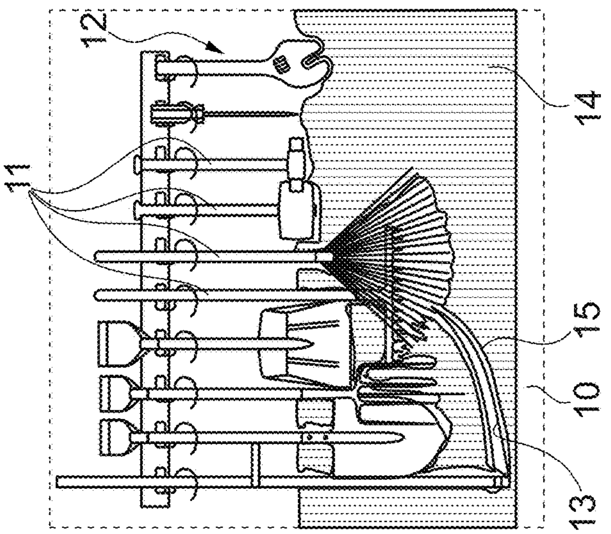
FIG. 4 illustrates an exemplary light marking projected onto a wall surface with the fit of a marking border to the structure border in the parking position, according to some embodiments.

FIGS. 2-4 show an example relating to a given wall situation (FIG. 2), a determined light marking (FIG. 3) and the representation of the light marking when the ideal distance position is reached (FIG. 4).

FIG. 2 illustrates an exemplary schematic diagram of the wall surface 10, on which, in the example shown, a large number of individual objects 11 in the form of garden equipment and tools are arranged; they hang on a fastening device on the wall surface 10. The objects 11 form a three-dimensional structure 12, since they stand out three-dimensionally from the wall surface 10 and make it possible to ascertain a structure border 13, i.e., an object edge, which borders portions of the structure 12. This structure border 13 is shown as an example in FIG. 2. The image shown in FIG. 2 represents a camera image that is evaluated in the control device 6 so that the control device 6 can ascertain the structure border 13.

The control device 6 then ascertains a light marking 14 which has a marking border 15 which is the negative of the structure border 13 of the structure 12, which represents the positive. FIG. 3 shows a schematic diagram of the light marking 14 with the marking border 15, which as a negative corresponds exactly to the structure border 13 forming the positive, as shown in FIG. 2. Obviously, it is not necessary for the structure border 13 to border the entire three-dimensional structure; rather, it is sufficient if only a portion of it is taken into account. The light marking 14 does not have to illuminate the entire structure 12 with a corresponding marking border 15; here too, illumination of some portions is sufficient, in particular if characteristic border shapes or edges are present, as in the example shown.

Once the geometry of the light marking 14 has been determined, as shown in FIG. 3, the light marking 14 is projected onto the wall surface 10 via one or both lighting devices 2, 3. If the distance between the motor vehicle 1 and the wall surface 10 is correspondingly large, the light marking 14 is also correspondingly large; i.e., the marking border 15 is relatively far away from the structure border 13. The light marking 14 was determined at a specific point in time at which there was a specific distance of the motor vehicle 1 from the wall surface 10. The assistance system also knows what the ideal distance is so that the assistance system can ascertain, based on the actual distance, how large the light marking 14 is that is to be projected onto the wall surface 10 by the lighting device 2, 3, so that the light marking continuously becomes smaller as the approach gets nearer and, when the ideal parking distance is reached, the marking has a size at which the marking border 15 matches the size of the structure border 13. At the beginning of the projection, a correspondingly large light marking is therefore displayed, the marking border of which is at a far distance from the structure border, wherein as the approach gets nearer, the marking border approaches closer and closer to the structure border, because the size of the projected light marking becomes smaller and smaller as a result of the distance, until, when the ideal distance position is reached, the light marking has a size at which the marking border 15 ideally matches the structure border 13.

This situation is shown in FIG. 4, which in turn shows the wall surface 10 with the structure 12 provided thereon, i.e., the plurality of individual objects 11, as well as the light marking 14 with its marking border 15, which, as can be seen, coincides exactly with the structure border 13. At this moment, the person driving the vehicle thus sees the exact fit of the borders or the two edges, and knows that the ideal distance position has been reached, so that they can stop the vehicle.

However, it is also conceivable that a fully automatic longitudinal guidance operation of the motor vehicle 1 is provided. This is because, when the wall surface 10 is continuously captured via the camera device 7, the images of which then show the structure 12 and the projected light marking 14, the control device 6 can continuously ascertain the position of the marking border 15 relative to the structure border 13 and can thus detect their continuous nearing. As the accuracy of the fit improves, an automatic longitudinal intervention can take place in such a way that the assistance system automatically further slows the motor vehicle until it moves more and more slowly into the ideal distance position, at which point the system automatically stops the motor vehicle 1.

It is also conceivable to provide lateral guidance information via the light marking 14 shown. This is projected, for example, onto the wall surface 10 in exact prolongation of the vehicle's longitudinal axis L. If the vehicle's longitudinal axis L is not orthogonal to the wall surface plane, a lateral offset necessarily results, i.e., the marking border 15 is noticeably shifted laterally to the structure border 13. Either the person can carry out the alignment by their own steering action, wherein as the longitudinal axis L gets closer to the position perpendicular to the plane of the wall surface, the distance of the marking border 15 runs more and more symmetrically to the marking border 13. However, this lateral guidance can also be carried out automatically via the assistance system. Once the best possible lateral alignment has been achieved, the lateral guidance can then be stopped until the ideal distance position is reached.

The invention claimed is:

1. A method for supporting a parking process of a motor vehicle, comprising:

capturing an image of a wall surface;

analyzing the image to extract a three-dimensional structure of the wall surface from the image;

determining a structure border of the three-dimensional structure;

determining a light marking projection based on the structure border, wherein the light marking projection comprises a marking border having a shape corresponding to the structure border; and projecting, by one or more lighting devices, the light marking projection onto the wall surface, wherein a position of the marking border relative to the structure border is based on a distance and/or a position of the motor vehicle.

2. The method of claim 1, wherein the three-dimensional structure comprises one or more objects arranged in front of the wall surface.

3. The method of claim 1, wherein the three-dimensional structure comprises one or more elevations in the wall surface.

4. The method of claim 1, wherein the three-dimensional structure comprises one or more depressions in the wall surface.

5. The method of claim 1, wherein the one or more lighting devices comprises one or more headlights.

6. The method of claim 1, further comprising:

continuously recording one or more images of the wall surface to determine a degree of alignment between the marking border and the structure border.

7. The method of claim 6, further comprising:

controlling a driving operation of the motor vehicle based on the degree of alignment between the marking border and the structure border.

8. The method of claim 7, wherein the controlling comprises stopping the motor vehicle when the degree of alignment between the marking border and the structure border reaches a threshold.

9. The method of claim 7, wherein the driving operation is controlled in response to the projecting and until an end position is reached.

10. A motor vehicle, comprising:

one or more lighting devices;

one or more cameras; and a controller configured to perform operations comprising:

capturing an image of a wall surface;

analyzing the image to extract a three-dimensional structure of the wall surface from the image;

determining a structure border of the three-dimensional structure;

determining a light marking projection based on the structure border, wherein the light marking projection comprises a marking border having a shape corresponding to the structure border; and projecting, by the one or more lighting devices, the light marking projection onto the wall surface, wherein a position of the marking border relative to the structure border is based on a distance and/or a position of the motor vehicle.

11. The motor vehicle of claim 10, wherein the three-dimensional structure comprises one or more objects arranged in front of the wall surface.

12. The motor vehicle of claim 10, wherein the three-dimensional structure comprises one or more elevations in the wall surface.

13. The motor vehicle of claim 10, wherein the three-dimensional structure comprises one or more depressions in the wall surface.

14. The motor vehicle of claim 10, wherein the one or more lighting devices comprise one or more headlights.

15. The motor vehicle of claim 10, the operations further comprising:

continuously recording one or more images of the wall surface to determine a degree of alignment between the marking border and the structure border.

16. The motor vehicle of claim 15, the operations further comprising:

controlling a driving operation of the motor vehicle based on the degree of alignment between the marking border and the structure border.

17. The motor vehicle of claim 16, wherein the controlling comprises stopping the motor vehicle when the degree of alignment between the marking border and the structure border reaches a threshold.

18. The motor vehicle of claim 16, wherein the driving operation is controlled in response to the projecting and until an end position is reached.

* * * * *